United States Patent
Wu et al.

(10) Patent No.: US 6,370,188 B1
(45) Date of Patent: Apr. 9, 2002

(54) PHASE AND FREQUENCY OFFSET COMPENSATION IN A TELECOMMUNICATIONS RECEIVER

(75) Inventors: Song Wu; Domingo G. Garcia, both of Plano; Michael O. Polley, Garland, all of TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/282,403

(22) Filed: Mar. 31, 1999

(51) Int. Cl.$^7$ ................................................ H04B 1/38
(52) U.S. Cl. ..................... 375/222; 375/326; 375/327
(58) Field of Search ............................. 375/219, 220, 375/222, 316, 326, 344, 345, 327, 215, 376; 327/141; 329/307, 325, 346, 358, 359, 360; 379/219, 399, 402, 408; 455/73, 75, 78, 83, 88, 557, 147, 208, 227, 265

(56) References Cited

U.S. PATENT DOCUMENTS

| | | | | |
|---|---|---|---|---|
| 5,608,764 A | * | 3/1997 | Sugita et al. | ................ 375/344 |
| 6,031,868 A | * | 2/2000 | Robertson et al. | ........... 375/222 |
| 6,067,319 A | * | 5/2000 | Copeland | ..................... 375/232 |
| 6,088,386 A | * | 7/2000 | Spruyt et al. | ................ 375/222 |
| 6,101,230 A | * | 8/2000 | Chun et al. | ................... 375/355 |

* cited by examiner

Primary Examiner—Chi Pham
Assistant Examiner—Emmanuel Bayard
(74) Attorney, Agent, or Firm—J. Dennis Moore; W. James Brady, III; Frederick J. Telecky, Jr.

(57) ABSTRACT

A modem (55) including receive circuitry (30) implemented by way of a digital signal processor (32, 32') is disclosed. The receive circuitry (30) operates according to a receive clock ($CLK_r$) that is based upon the output of a free run oscillator (50). An incoming frequency multiplexed signal (f(t)) is sampled by an analog-to-digital converter (31) and demodulated by way of a Fast Fourier Transform function (36). After such demodulation, a phase rotation function (40) applies a phase shift to the demodulated signal corresponding to an estimated phase offset (τ) between the receive clock ($CLK_r$) and a pilot signal (P) transmitted by the transmitting modem; a finite impulse response filter function (42) applies a digital filter to the demodulated signal to correct for phase error based upon an estimated frequency offset (Δ). According to another disclosed embodiment, a pre-emphasis FIR filter function (52) and a pre-emphasis phase rotation function (54) are applied to an upstream singal, based upon the estimated phase offset (η) and frequency offset (Δ).

19 Claims, 4 Drawing Sheets

PHASE AND FREQUENCY OFFSET COMPENSATION IN A TELECOMMUNICATIONS RECEIVER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of telecommunications, and is more specifically directed to the digital signal processing of frequency multiplexed signals in such telecommunications.

In recent years, the data rates at which communications may be carried out over conventional telephone networks and wiring has greatly increased. These increases are due, in large part, to newly adopted techniques of multiplexing and modulating signals representative of the messages or data being communicated, resulting in greatly improved communication bandwidth. In addition, the carrier frequencis at which such communications are being carried out have also increased in recent years, futher improving the bit rate.

According to one well-known class of multiplexing, digital data are communicated at multiple sub-carrier frequencies, or tones. This class of frequency multiplexing is referred to as Discrete MultiTone (DMT) in wired communication, or alternatively as Orthogonal Frequency Division Multiplexing (OFDM) in wireless communication. In this type of multiplexing, the stream of data symbols are multiplexed into N parallel subchannels, each subchannel being associated with a sub-carrier frequency. After modulation, the sub-carriers are added and transmitted together as an analog signal; at the receiving end, the sub-channels are filtered from one another and the original non-multiplexed data streanm is recovered.

It is important in this type of multiplexing that neighboring sub-carrier frequencies do not interfere with one another. Of course, wide separation of the sub-carrier frequencies would eliminate such interchannel interference (ICI), but at a cost of low spectral density. A well known method of ensuring orthogonality of the sub-carriers, and thus avoiding ICI, is to utilize a rectangular pulse shape as the sub-carrier pulse. According to the theorems of the Fourier Transform, a rectangular pulse in the time-domain transforms into a $\sin(x)/x$ frequency-domain spectrum. In the frequency multiplexing case, this spectrum is centered about the sub-carrier frequency $f_0$, and has an argument $x = \pi NT(f - f_0)$, where $f$ refers to the actual frequency of the communication, N is the number of parallel subchannels being transmitted, and T is the period of communication of discrete information (i.e., the reciprocal of the symbol communication rate). Proper selection of the sub-carrier frequencies to ensure orthogonality follows the relationship:

$$f_k = k/NT$$

where k is the sub-carrier index (i.e., the "tone" in the multitone set). If this relationship is maintained in assigning the sub-carrier frequencies, each sub-carrier will have a center frequency that is located at a zero crossing of the spectrum of other sub-carriers, and as such each sub-carrier will be orthogonal to the other encoded sub-carriers.

FIG. 1 illustrates the frequency spectrum of a sub-channel in OFDM or DMT transmission. In the frequency response plot of FIG. 1, the frequency axis is measured in sub-carrier index values relative to the index of the center frequency. The center frequency (relative index of 0) provides the maximum frequency response, as shown. At relative index values of ±1, for example, the frequency response for the sub-channel is at zero. Accordingly, the sub-channel illustrated in FIG. 1 will provide no contribution at the center frequencies of the adjacent sub-channels (relative index of ±1); conversely, since the adjacent sub-channels have the same normalized frequency response as shown in FIG. 1, they will provide no contribution to the sub-channel of FIG. 1 (relative index of 0). Furthermore, as shown in FIG. 1, the frequency response is zero at each integer value of relative index. As such, the illustrated sub-channel provides no contribution to any other sub-channel, and conversely no other sub-channel contributes to the signal at the center frequency of the illustrated sub-channel of FIG. 1. The use of a rectangular pulse thus provides orthogonality among the various sub-channels, permitting close spacing of the center frequencies and thus high spectral density.

In order to maintain orthogonality, however, the modulation and demodulation of the signals must be performed at the same precise center frequencies. As evident from FIG. 1, if demodulation is performed at a frequency that is slightly offset from the center frequency, not only will the frequency response for the desired sub-channel be less than optimal, but the demodulated signal will also contain contributions from other sub-channels; these contributions amount to interchannel interference (ICI), and greatly reduce the signal quality of the system. It is therefore important to ensure precision in the demodulation frequencies in DMT/OFDM communication systems.

The precise matching of modulation and demodulation frequencies is made difficult in modem communications by the physical separation of communicating modems from one another, where each of the communicating modems is driven by its own local clock. Conventional DMT/OFDM modems typically use expensive and complicated circuitry to ensure such precise frequency mathcing. FIG. 2 illustrates the construction of the receiver side of conventional DMT modem 10. As shown in FIG. 2, modem 10 receives signals from the telephone network at analog-to-digital converter (A/D) 14. The signals received by modem 10 include, in addition to the communicated messages, a pilot tone generated by the transmitting modem to communicate the frequency at which it carried out the modulation of the message data. The digital output of A/D 14 is processed by time-domain equalization function 20, cyclic prefix removal function 22, Fast Fourier Transform (FFT) function 24, and frequency domain equalization function 26 (such functions typically performed by digital signal processor, or DSP, 12), following which the received communicated signals are applied, in digital form, to the host computer of modem 10. Temporal control of modem 10 is maintained in response to the pilot tone, as recovered from the received communication by FFT function 24, which generates a digital value corresponding to the instantaneous frequency of this detected tone. The frequency of the pilot tone is filtered by digital filter function 28 (also typically within DSP 12), converted into an analog signal by digital-to-analog converter (D/A) 18, and applied to voltage controlled oscillator (VCXO) 16. VCXO 16 responds to the analog signal corresponding to the pilot tone frequency to control A/D 14, such that the time-domain sampling and conversion of the incoming received communication is performed at a frequency that precisely matches that of the transmitting modem (as communicated by way of the pilot tone). A phase-locked loop (not shown) may also be implemented in conventional modem 10, to ensure stable matching of the output of VCXO 16 relative to the incoming signals.

It has been observed, however, that VCXO 16 is typically an expensive function to include in client-side modem systems, Furthermore, fluctuations in the control voltage appluied to VCXO 16 by D/A 18 directly cause frequency jitter at the output of VCXO 16; such fluctuations are common for modems within electtrically noisy environments such as modern personal computers and workstations. As a result, the conventional modem construction, as shown in FIG. 2, includes expensive oscillator circuitry that still does not provide a high degree of precision in its frequency output when implemented in the usual applications.

A relatively new type of current modem communications technology is referred to in the art as digital subscriber line ("DSL"). DSL refers generally to a public network technology that delivers relatively high bandwidth over conventional telephone company copper wiring at limited distances. DSL has been further separated into several different categories of technologies, according to a particular expected data transfer rate, the type and length of medium over which data are communicated, and schemes for encoding and decoding the communicated data. According to this technology, data rates between DSL modem may be far greater than current voice modem rates. Indeed, current DSL systems being tested or projected range in rates on the order of 500 Kbps to 18 Mbps or higher. According to certain conventional techniques, such as the protocol referred to as Asymmetric Digital Subscriber Line (ADSL) and which corresponds to ANSI standard T1.413, the data communication rates are asymmetrical. Typically, the higher rate is provided for so-called downstream communications, that is from the telephone network central office to the customer modem, with upstream communication from the customer modem to the central office having a data rate consideraly lower than the downstream rate.

In current-day ADSL systems operating according to DMT modulation, only one of the communicating modems has a master clock; typically, the central office modem generates this master clock signal. The client modem is thus required to recover the master clock signal from the communicated data stream, and use this clock not only to sample and demodulate the received data stream, but also in its transmission of upstream data to the central office modem. According to the ADSL standard, the central office modem will expect a jitter-free upstream, or reverse link, data stream, sampled and modulated according to the master clock signal.

BRIEF SUMMARY OF THE INVENTION

It is therefore an object of the present invention to provide a low cost modem that provides a high degree of precision in the communication of frequency multiplexed communications.

It is a further object of the present invention to provide such a modem and method of operating the same in which operation of the receiving side of the modem may be driven by a low-cost, free run oscillator.

It is a further object of the present invention to provide such a modem and method of operating the same that utilized digital signal processing (DSP) functionality to correct for phase and frequency offset in the demodulation process.

It is a further object of the present invention to provide correction for reverse link transmission in an Asymmetric Digital Subscriber Line (ADSL) communication environment.

Other objects and advantages of the present invention will be apparant to those of ordinary skill in the art having reference to the following specification together with its drawings.

The present invention may be implemented into receive circuitry in modem, of either the wireless or wired type, for receiving frequency multiplexed communications. The sampling and demodulating circuitry is controlled by a numerically controlled oscillator (NCO) deriving a clock based upon the output of a free run crystal oscillator. Estimation of the phase offset and frequency offset of the demodulation controlled by the oscillator, relative to the transmitted signal, is made by the receive circuitry relative to the transmitted pilot tone. Phase rotation is applied to the receiver signal to compensate for the phase offset. A digital filter, such as a Finite Impulse Response (FIR) filter executed by a digital signal processor (DSP), corrects for frequency offset in the demodulated received signal. As a result, the receive modem can be constructed using relatively low cost clock and oscillator circuitry, while maintaining excellent orthogonality among sub-channels.

According to another aspect of the invention, the receive circuitry constructed according to the present invention is implemented in a client modem receiving and transmitting Asynchronous Digital Subscriber Line (ADSL) communications. The client modem implements a pre-emphasizing operation upon the reverse link transmission signal to compensate for the frequency offset of the free run oscillator or NCO relative to the master clock of the central office modem; a pre-transmission phase rotation pre-compensates for the phase rotation, as well. The upstream transmissions thus arrive at the central office modem without frequency or phase offset caused by the oscillator controlling the client modem.

DETAILED DESCRIPTION OF THE INVENTION

Figure 3:
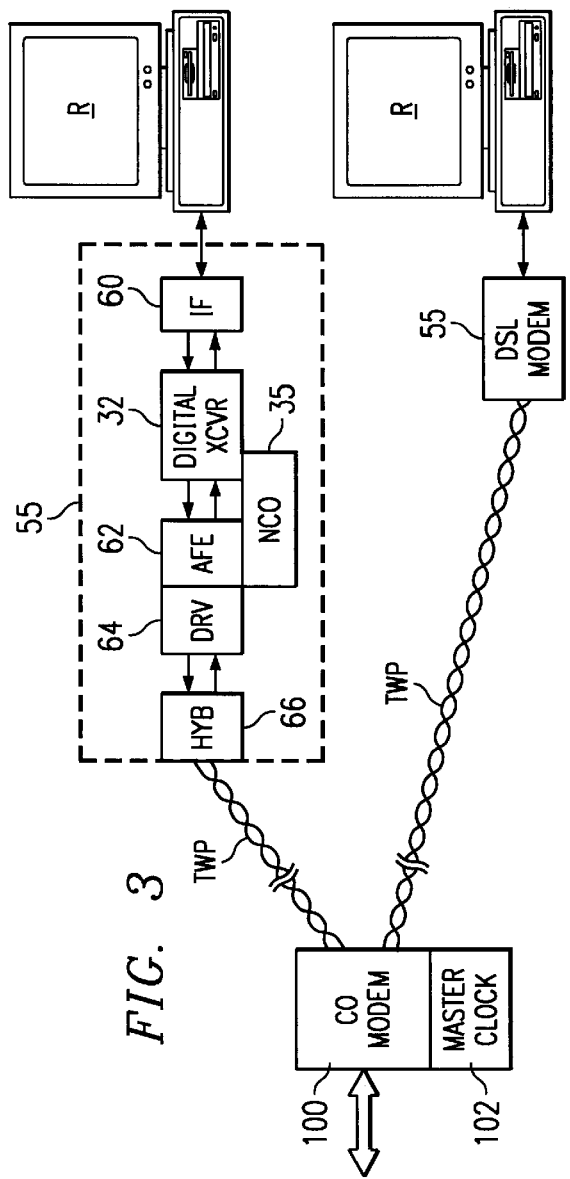
FIG. 3 is an electrical diagram, in block form, of a Digital Subscriber Line communications system, within which the present invention may be implemented.

Referring now to FIG. 3, an example of an electronic system into which the present invention may be beneficially implemented will now be described by way of example; this exemplary system corresponds to digital subscriber line (DSL) modems, particularly those of the asynchronous type (i.e., ADSL modems). While this example of FIG. 3 pertains to wired communications, such as is carried out over conventional telephone network wiring, the present invention will also be of benefit in wireless communications. As such, it is contemplated that those of ordinary skill in the art will recognize that the following desription of a wired system is presented by way of example only, and, having reference to this specification, will be readily able to realize the present invention in a wireless system.

FIG. 3 illustrates a typical system installation of DSL services, in which multiple remote subscribers interface with a telephone system central office. In this example, a user in a home or office environment operates host computer system R, such as a personal computer or workstation, or alternatively an entertainment unit in the video-on-demand (VOD) context. Each of host computer systems R serves as a remote source and destination of communicated data, which may be representative of text, graphics, motion pictures, audio, etc. Each host computer R is associated with a remote DSL modem 55, by way of which the host computer R communicates with central office DSM modem 100 over a conventional twisted-pair telephone facility TWP. One or more telephones (not shown) may also be connected into each twisted pair wire facility TWP, such that "Plain Old Telephone Serive" (POTS) voice communications may alternatively or additionally be communicated over twisted pair wire facility TWP. The DSL technology in the specific example of FIG. 3 may be of the asymmetric type (i.e., ADSL), with traffic traveling from central office modem 100 to remote modems 55 at a signal bandwidth that is higher in frequency than that of traffic traveling from remote modems 55 to central office modem 100 (i.e., upstream).

As illustrated in FIG. 3, each of twisted pair wire facilities TWP is received by central office DSL modem 100, which is contemplated to be located in a central office of the local or long distance telephone service provider. Central office modem 100, in this example, is capable of receiving multiple twisted pair wire facilities TWP (only two of which are illustrated in this example). Central office modem 100 provides communication of data between twisted pair wire facilities TWP, and thus host computers R, and its own host computer (not shown in FIG. 3) which serves as the source or destination of data, or as in intermediate gateway to a network, such as the Internet, or a dedicated "dial-up" content provider or network. Of course, the central office will typically also include switchgear for the routing of calls such as those placed by host computers R (or associated telephones) over twisted pair wire facilities TWP. As noted above, central office modem 100 will likely be connected to a backbone network, which in turn is in communication with other communication paths by way of equipment such as routers or Digital Subscriber Line Access Multiplexers (DSLAMs). In the application where POTS service overlays the ADSL data traffic, such equipment may also include some type of "splitter" for separating POTS from the data traffic, routing the POTS traffic to the conventional telephone network (PSTN) and routing the data to a wide-area network (WAN).

As illustrated in FIG. 3, central office modem 100 is coupled to master clock circuitry 102 which, as will be described in detail hereinbelow, generates a clock signal that controls the sampling and encoding of "downstream" transmissions to remote modems 55, such transmissions including a pilot signal that is derived from, or by, master clock circuitry 102.

In the example of FIG. 3, remote DSL modems 55 are each arranged as a plurality of functions, which roughly correspond to individual integrated circuits in this exemplary embodiment of the invention. It is of course to be understood that the particular integrated circuit, or "chip", boundaries among these various functions may vary among implementations; the exemplary realization illustrated in FIG. 3 is provided by way of example only. In this example, one of remote DSL modems 55 is shown in further detail, as including a host interface 60, for interfacing with its associated remote system R. Host interface 60 is of conventional construction for such interface functions, an example of which is the TNETD2100 digital serial bus interface circuit available from Texas Instruments Incorporated.

According to this embodiment of the invention, remote DSL modem 55 includes a digital transceiver function for executing the necessary digital processing operations for both transmission and receipt of the data payload; according to the preferred embodiment of the invention shown in FIG. 3, this digital transceiver function is implemented as programmable digital signal processor (DSP) 32. For transmission, the operations performed by DSP 32 include such functions as formatting of the digital data from the host computer R (into packets and frames, for example), encoding of the data into appropriate subchannels for transmission, and performing and inverse Fast Fourier Transform (IFFT) to transform the encoded data into time domain signals; on the receive side, DSP 32 performs the reverse of these operations, as well as echo cancellation processing. Particularly at the data rates discussed hereinabove, the digital data processing capacity and power of DSP 32 is preferably of a high level, such as that provided by digital signal processors of the TMS320C6x type available from Texas Instruments Incorporated.

Remote modem 55 further includes analog circuitry by way of which the digital tranceiver function carried out by DSP 32 is placed in communication with its associated twisted pair facility TWP, and thus with central office modem 100. In this example, DSP 32 is bidirectionally interfaces with line driver 64, which is a high-speed line driver and receiver for driving and receiving the ADSL signals on twisted pair facility TWP, such as the THS6002 line driver available from Texas Instruments Incorporated. Line driver 64 in remote modems 55 is, in this example, connected to a four-wire to two-wire "hybrid" integrated circuit 66, which converts the dedicated transmit and receive lines from line driver 64 to two-wire twisted pair facility TWP, in full-duplex fashion.

As shown in FIG. 3, remote modem 55 according to the preferred embodiments of the invention includes numerically controlled oscillator (NCO) 35, which generates a clock signal based upon the output of a free run oscillator, as will be described hereinbelow. As will become apparent from the following description, the present invention permits the use of such a numerically controlled oscillator (NCO) to control the sampling and demodulation carried out by the receive side of DSL modems. As will be recognized by those in the art, such NCO circuitry is significantly less expensive to implement, according to modern technology, than is a voltage controlled oscillator and phase-locked loop clock circuit, or other high precision clock circuitry, as conventionally used in the demodulation of frequency multiplexed communications.

Figure 4:
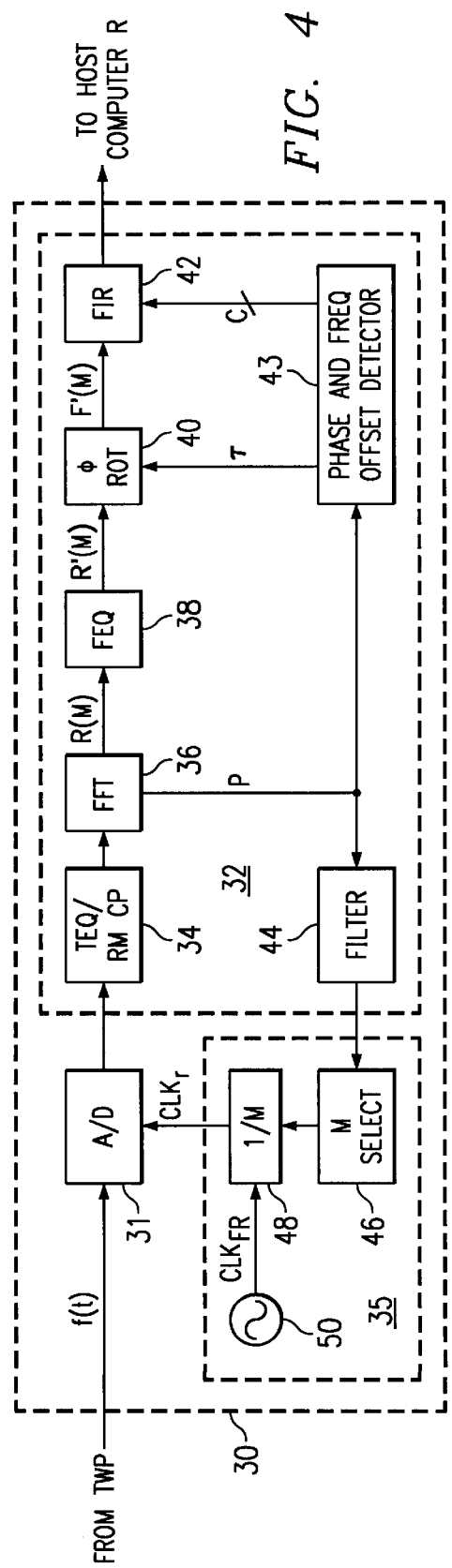
FIG. 4 is an electrical diagram, in block form, or receive circuitry in a modem constructed according to a first preferred embodiment of the present invention.

Referring now to FIG. 4, receive circuitry 30 in modem 55 constructed according to a first preferred embodiment of the invention will now be described. As noted above, remote modem 55 of FIG. 3 handles both transmission and receipt of data, and as such one may consdier modem 55 as having transmit and receive "sides" although, especially when the digital transceiver function is implemented as a DSP such as DSP 32, these "sides" will be functionally, rather than physically, separate. However, for the purposes of the following description, it is believed that description of the transmit and receive functions in modem 55 will provide a clear description of the operation of the present invention to those of ordinary skill in the art. As such, while the term "receive circuitry" is used in this description, it is to be understood that such receive circuitry will generally not be physically distinct, in all aspects, from "transmit circuitry" in modem 55.

As will be apparent to those in the art, receive circuitry 30 according to this embodiment of the invention will be of benefit in either wireless or wired modem communication of frequency multiplexed signals. For purposes of clarity of description, however, receive circuitry 30 will be described relative to wired communication, such as that carried out over conventional telephone networks, and as such will use wired-modem-communication nomenclature (e.g., DMT, as opposed to OFDM as used in the wireless field); it will of course be understood that similarly constructed and operated circuitry as that described herein relative to FIG. 4 can be used in wireless communications, as well.

Receive circuitry 30 according to the preferred embodiment of the invention, as shown in FIG. 4, includes analog-to-digital converter (A/D) 31, which receives the incoming signal from twisted pair facility TWP in this wired modem (of course, in the wireless case, A/D 31 would receive an analog signal from an antenna and receiver circuitry). In the arrangement of modem 55 of FIG. 3, A/D 31 resides in AFE 62. In this embodiment of the invention, A/D 31 is clocked by a clock signal $CLK_r$, which is generated by way of a numerically controlled oscillator circuit 35, based upon the output $CLK_{FR}$ of free run oscillator 50. The construction and operation of numerically controlled oscillator 35 will be described in further detail hereinbelow.

According to this preferred embodiment of the invention, digital signal processor (DSP) 32 performs various digital signal processing operations and functions upon the received transmissions. In FIG. 4, these digital functions are illustrated as functional blocks in receive circuitry 30, within the boundary of DSP 32, as the implementation of such functions as program instructions executable by a DSP is believed to be especially beneficial. In this regard, FIG. 4 illustrates these digital functions as having "inputs" and "outputs" as functional connections among one another; for purposes of this description, such inputs and outputs are considered to be carried out by way of the storage and retrieval of signals in and from a memory, as conventionally carried out by modern DSPs. Alternatively, it is cotemplated that some or all of the functions illustrated in block form in FIG. 4 may be realized by way of custom logic (in which case the inputs and outputs would be present in the physical sense), without departing from the scope of the present invention.

In the preferred embodiment of the invention as shown in FIG. 4, the output of A/D 31 is processed by way of time domain equalization and cyclic prefix removal function 34, in the conventional manner. The sampled time domain signal at the output of time domain equalization and cyclic prefix removal function 34 is then demodulated by Fast Fourier Transform (FFT) function 36, which transforms this signal into a series of values corresponding to the values of the received signal at discrete frequencies, in the conventional manner. Frequency domain equalization of the demodulated frequency domain signal R(m) from the output of FFT function 36 is then performed by frequency domain equalization function 38, to compensate for the effects of the transmission channel (i.e., twisted pair facility TWP), in the conventional manner.

Figure 1:
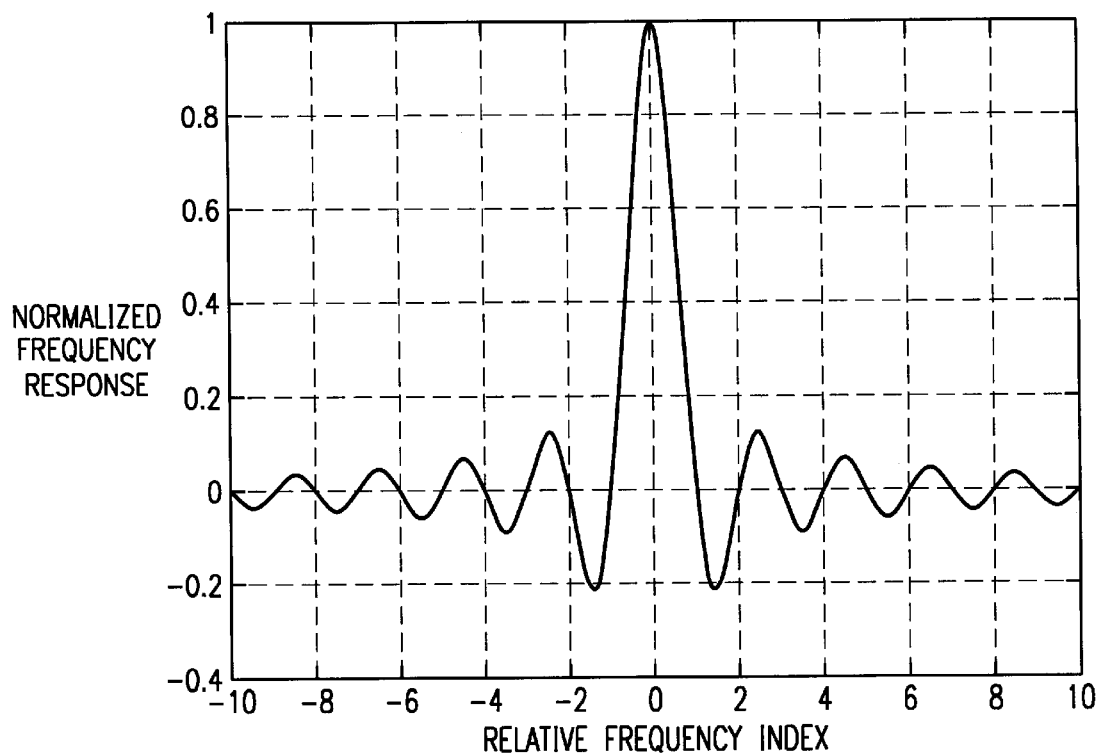
FIG. 1 is a plot of normalized frequency response versus frequency, for a sub-channel of frequency multiplexed communications using a $\sin(x)/x$ frequency domain modulation.
Figure 2:
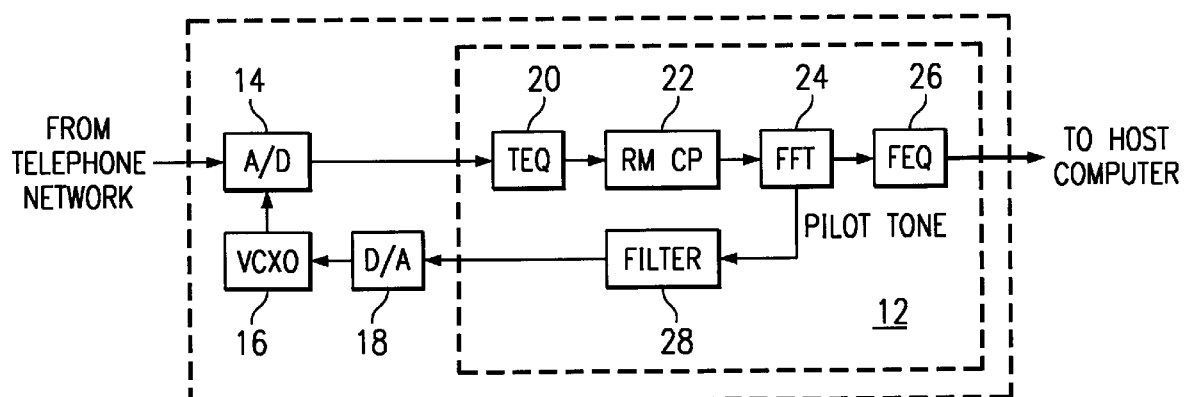
FIG. 2 is an electrical diagram, in block form, or receive circuitry in a conventional modem.

As described above relative to FIG. 2, a specific output of FFT function 36 is a frequency domain series of values corresponding to the detected pilot tone, which is forwarded (as signal P as shown in FIG. 4) to digital filter function 44, also contained within DSP 32. The output of digital filter function 44 is forwarded to numerically controlled oscillator circuit 35, the construction and operation of which will now be described.

As noted above, the use of a free run crystal oscillator and support circuitry for generating receive clock $CLK_r$, provides for a simple and inexpensive manner of implementing clock circuitry, especially relative to conventional voltage controlled oscillators and phase-locked loops. However, clock circuitry based upon a free run oscillator will not generate a clock signal at a precise frequency. In the case of receive circuitry 30 in modem 55, the frequency of signal $CLK_{FR}$ from free run oscillator 50, and clock signals generated therefrom such as receive clock $CLK_r$, will thus generally not match the frequency of the incoming communications, but will operate at a frequency that is offset from the transmission frequency.

Figure 5A:
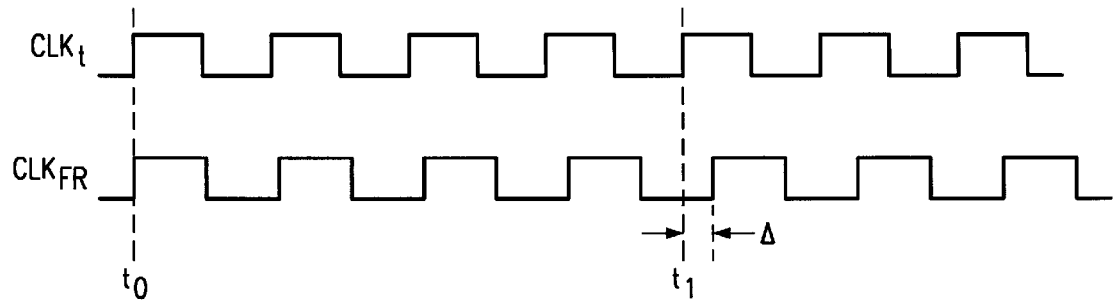
FIG. 5a is a timing diagram illustrating the effect of frequency offset between a transmit clock and a free-run oscillator.

FIG. 5a illustrates the effects of such frequency offset, in comparing free run clock $CLK_{FR}$ with transmit clock $CLK_t$. As shown in FIG. 5a, clock signal $CLK_t$ corresponds to the clock signal associated with the transmitted communications, and as such effectively corresponds to the pilot signal in DMT tranmissions. Clock signal $CLK_{FR}$ is an example of a clock signal that is based upon a free run oscillator, such as free run oscillator 50. As shown in FIG. 5a, the leading edge of signals $CLK_t$ and $CLK_{FR}$ are aligned at time $t_0$; however, because of the offset in frequency between the transmitted clock $CLK_t$ and free run oscillator clock $CLK_{FR}$, the phase error present in the first cycle after alignment accumulates with each succeeding cycle. At time $t_1$ of FIG. 5a, the lag of clock signal $CLK_{FR}$ relative to clock $CLK_t$ is significant, having an amount $\Delta$ as shown in FIG. 5a. In the case of a modem that samples a data stream in a synchronous manner with clock $CLK_{FR}$, where the transmitted data stream is synchronous with clock $CLK_t$, the phase error will eventually accumulate to such an extent that a sample will be missed.

In order for a modem to completely recover the incoming message when sampling and demodulating according to such an offset clock signal, the receive side of the modem must ensure that it obtains the same number of samples, in a given time period, as transmitted by the transmitting modem. In the case of DMT and OFDM frequency multiplexing, each frame at the receiver must therefore align with each transmitted fram to an accuracy within one sample; in other words, in each frame period, the receiver must have precisely the same number of samples as those used in transmission.

Figure 5B:
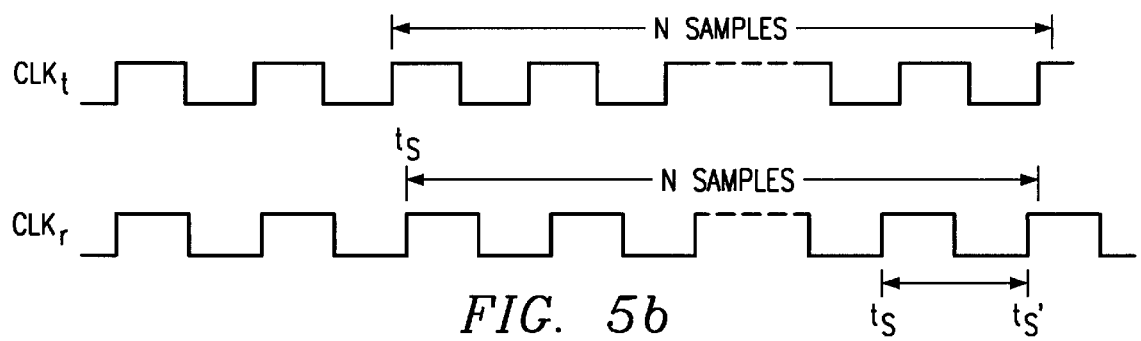
FIG. 5b is a timing diagram illustrating the operation of a non-tuned numerically controlled oscillator in ensuring proper sampling, according to the preferred embodiment of the invention.

The effect of a simple numerically controlled oscillator based upon a free run oscillator is illustrated in FIG. 5b; in this case, the output of the free run oscillator is effectively used directly for sampling and demodulation, without any tuning circuitry. If no tuning is utilized, digital circuitry in the receiver modem can only resample data from a continuous A/D output data stream by setting a reference point in each receiver frame in alignment with the transmitted fram, in order to maintain sample synchronization. This requires monitoring of the phase error of the receiver reference point relative to the transmit clock, and advancing or delaying the reference point in the event that the accumulated phase error in the receive clock approaches 360°, or one sample. In the example of FIG. 5b, reference point $t_s$ is selected at the rising edge of receive clock stream $CLK_r$, lagging the leading edge of the transmit clock stream $CLK_t$. As the phase error between clocks $CLK_t$ and $CLK_r$ accumulates nearly to 360°, in this example, the receiver modem advances the reference point $t_s$ to the next cycle, at reference point $t_s'$. This ensures that N samples are provided and obtained in both the transmitter and receiver sequences in the same period of time. However, according to this simple scheme, the digital circuitry in the receiver modem must be capable of correcting both frequency offset and phase offset to an accumulated error magnitude of up to 360° in demodulating the sampled received data stream.

Another approach to the implementation of a numerically controlled oscillator reduces the error correction requirements of the digital circuitry. This approach is implemented in receive circuitry 30 of FIG. 4, by way of numerically controlled oscillator 35. As shown in FIG. 4, the output of free run oscillator 50 is applied to divider circuit 48, which generates a periodic receive clock on line $CLK_r$ by dividing the frequency of the clock output $CLK_{FR}$ of free run oscillator 50 by an integral value selected according to a control signal applied thereto by M select circuit 46.

According to this preferred embodiment of the invention, receive clock signal $CLK_r$ is derived by dividing down the frequency of the output $CLK_{FR}$ of free run oscillator 50 by a selected one of an integer M and its adjacent integers M−1 and M+1. Integer M will, of coures, be selected according to the approximate frequency relationship between free run clock $CLK_{FR}$ and the expected frequency of transmit clock $CLK_t$. The selection of the appropriate divisor integer among values M−1, M, M+1 is made by M select circuit 46, in response to the frequency of the pilot tone as presented as signal P and filtered by filter function 44.

In operation, numerically controlled oscillator 35 adjusts the duration of one of the periods of receive clock $CLK_r$ to ensure proper sampling. If N samples are present in a DMT frame, for example, one of the N samples (for example, the first sample) is sampled with receive clock $CLK_r$ generated by a selected one of the ratios M−1, M, M+1, depending upon the polarity of the frequency offset; all other samples in the frame are then taken with receive clock $CLK_r$ generated by dividing the frequency of free run clock $CLK_{FR}$ by integer M. M select circuit 46 selects the appropriate integer value based upon the filtered frequency signal of the pilot tone as signal P from FFT function 36. If the receive clock has a higher frequency than that of the transmit clock (i.e., the pilot tone), select circuit 46 causes divider circuit 48 to generate one period of receive clock at a frequency divider ratio of M+1 and all others in the frame of N samples are made at a frequency divider ratio of M; conversely, if the receive clock lags the transmit clock, select circuit 46 causes divider circuit 48 to generate one period of receive clock at a divider ratio of M−1 and the other periods in the frame with a divider ratio of M.

Figure 5C:
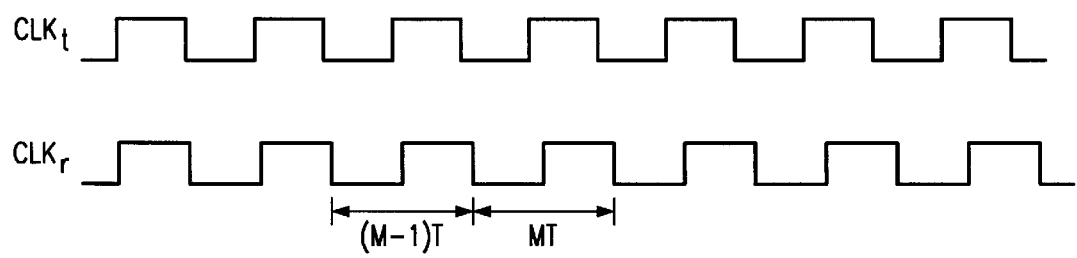
FIG. 5c is a timing diagrm illustrating the operation of a tuned numerically controlled oscillator in ensuring proper sampling, according to the preferred embodiment of the invention.

FIG. 5c illustrates the operation of numerically controlled oscillator 35, based upon a free run clock $CLK_{FR}$ of period T, for the example of receive clock $CLK_r$ lagging transmit clock $CLK_t$. In the example of FIG. 5c, one cycle of receive clock $CLK_r$ has a period of (M−1)T while all other cycles of receive clock $CLK_r$ have a period of MT. As a result of this approach, the phase error between transmit clock $CLK_t$ and receive clock $CLK_r$ is maintained relatively small, within a turning range of $1/_{MN}$ of the receive clock period, averaged over one DMT frame period.

According to the present invention, either the non-tuned free run oscillator approach noted above, or the numerically controlled oscillator 35 of FIG. 4, may be used to generate a receive clock signal from a free run oscillator in a modem. The tuned approach of FIG. 4 preferred, however, as its correction requirements are reduced from that of the non-tuned approach (which must correct errors up to 360°, as noted above).

In either scheme, phase offset and frequency offset will be present in the receiver samples. The relationship of the period $T_t$ of the transmit clock $CLK_t$ to the period $T_r$ of receive clock $CLK_r$ may be expressed as:

$$T_r = T_t + \Delta$$

where $\Delta$ is the frequency offset (specifically, the offset, or difference, between the periods of the transmit and receive clocks). Additionally, a phase error $\tau$ corresponds to the phase offset between the transmit and receive clocks. Using these offsets, a series r of received samples may be expressed as:

$$r(nT_r+\tau) = r(n(T_t+\Delta)+\tau)$$

If one were to attempt to correct for these frequency and phase offsets simply by interpolation with a Finite Impulse Response (FIR) filter, prior to digital demodulation, the computational requirements for such correction would exceed the capacity of modern, state-of-the-art digital signal processors (DSPs).

According to the present invention, however, the processing of demodulated samples to remove the phase and frequency error is performed. It has been observed that this post-demodulation processing may be performed by modern DSPs, such as DSP 32 in receive circuitry 30 of FIG. 4 according to the preferred embodiment of the invention, and as such can enable the use of low cost clock circuitry such as the numerically controlled oscillator 35, and non-tuned free run oscillators described above.

Referring back to FIG. 4, the processing of demodulated samples of the received signal occurs downstream (i.e., after) FFT funtion 36 and frequency equalization function 38, both of which are performed according to conventional techniques. As such, the signal after these processes 36, 38 is in the frequency domain, based upon time-domain samples acquired by A/D 31 using receive clock $CLK_t$ that was used to generate the communicated data.

The present invention is based upon the derivation of post-sampling corrections to the received data stream once the phase offset $\tau$ and frequency offset $\Delta$ are estimated from the pilot tone as described above. More specifically, separate corrections for phase offset and frequency offset are applied post-sampling, based on these estimates of phase offset $\tau$ and frequency offset $\Delta$. Consider the transmitter (e.g., central office modem 100) having samples at a frequency $f_s' = 1/T_t$ ($T_t$ being the sampling period in the transmitting modem); the Fourier transform of the transmitted signal is thus F(k), with k being the frequency bin index. One may then express the time domain transmitted signal f(t) as the inverse discrete Fourier transform of F(k), as follows:

$$f(t) = \sum_{k=0}^{N-1} F(k) \cdot \exp(j2\pi f_k t) \text{ where } f_k = \frac{k}{NT_t}.$$

where $f_k = k/NT_t$.

At the receiver end, sampling is at a frequency $f_s^r = 1/T_r$, where $T_r$ is the sampling period of the receiver. Considering the impulse response of the communication channel (e.g., twisted pair facility TWP) between the transmitting and receiving modems to be h(t), and thus the sampled channel impulse response as $h(nT_r)$, one may express the sampled-time domain received signal $r(nT_r)$ as:

r(nT_r)=h(nT_r)⊕f(nT_r+τ)

As described above, the sampled received signal $f(nT_r+\tau)$ may be considered as the inverse Fourier transform of the product of the frequency domain transmitted signal with the phase offset and frequency offset contributions:

$$f(nT_r) = \sum_{k=0}^{N-1} F(k) \cdot \exp(j2\pi f_k nT_r) \cdot \exp(j2\pi f_k \tau)$$

The expression for the sampled received signal $r(nT_r)$ may thus be expressed, in the frequency domain, as:

R(m)=H(m)*exp(j2πf_mτ)*F'(m)

where m refers to the frequency bin in the received signal spectrum and where F'(m) refers to the frequency spectrum of the transmitted signal with the error due to the frequency offset, but not the phase offset, of the receive clock. The term $\exp(j2\pi f_m \tau)$ corresponds to the error due to the phase offset. The transmitted signal with frequency offset error F'(m) may be expressed as:

$$F'(m) = \sum_{n=0}^{N-1} f(nT_r) \cdot \exp(-j2\pi f_m(nT_r))$$

where $f_m = m/NT_r$.

In the preferred embodiment of the invention illustrated in FIG. 4, the output of FFT function 36 is shown by frequency-domain series R(m), where m is the frequency bin index in the spectrum. According to the present invention, phase offset τ is separated from frequency offset Δ by considering the output of FFT function 36, based upon the series of receiver samples $r(nT_r+\tau)$, which is:

$$R(m) = \sum_{n=0}^{N-1} r(nT_r + \tau) \cdot \exp(-j2\pi f_r nT_r)$$

As noted above, it is desirable to separate the phase offset contribution from the frequency offset contribution in recovering the transmitted signal F(k). As such, the spectrum R(m) may be expressed as the product of a phase offset contribution with a spectrum F'(k) that represents the transmitted signal F(k) but including also the frequency offset from receive clock $CLK_r$, as follows:

$$R(m) = \exp(j2\pi f_m \tau) \cdot \sum_{n=0}^{N-1} r(nT_r + \tau) \cdot \exp(-j2\pi f_m(nT_r + \tau))$$

$$= \exp(j2\pi f_m nT_r) \cdot F'(k)$$

where:

$$F'(m) = \sum_{n=0}^{N-1} r(nT_m) \cdot \exp(-j2\pi f_m(nT_r))$$

The phase offset contribution to the received signal spectrum R(m) is $\exp(j2\pi f_m\tau)$. According to the present invention, once phase offset τ and frequency offset Δ are estimated for a receiver system, the effect of these offsets can be algorithmically removed from the received signal in the demodulation of the signal.

According to the preferred embodiment of the invention, as shown in FIG. 4, frequency domain equalizer function 38 operates upon the output R(m) of FFT function 36. Frequency domain equalizer 38 is preferably implemented in software, as a programmed routine executed by DSP 32, according to known techniques; as is well known in the art, frequency domain equalizer 38 is intended to compensate for frequency-dependent losses in the transmission channel (i.e., telephone network) between central office modem 100 and receive circuitry 30 in remote modem 50. For a channel impulse response of H(m), in the frequency domain, the filter FEQ(m) applied by frequency domain equalizer functuion 38 should satisfy the relationship:

FEQ(m)·H(m)≈1 over the frequencies of interest. Assuming proper training of frequency domain equalizer function 38 in receive circuitry 30, the output R'(m) of frequency doamin equalizer function 38 may be expressed as follows:

R'(m)=FEQ(m)*H(m)*exp(j2πf_mτ)*F'(m)

or:

R'(m)=exp(j2πf_mτ)*F'(m)

As noted above, the term $\exp(j2\pi f_m\tau)$ is the phase error term. According to the preferred embodiment of the invention, therefore, phase rotation function 40 is performed upon signal R'(m) at the output of frequency domain equalizer 38. Phase rotation function 40 is implemented as a conventional digital filter operation, to insert a phase shift into signal R'(m) that corresponds to the phase error exp$(j2\pi f_m\tau)$, using an estimated phase offset τ between the receive clock $CLK_r$ and transmit clock $CLK_t$.

According to the preferred embodiment of the present invention, DSP 32 also includes phase and frequency offset detection function 43. As noted above, in DMT and OFDM systems, the transmitting modem typically includes a pilot tone with its transmitted data, for precice synchronization of its sampling and modulating with the receiving moded. For a pilot tone of frequency $f_P$, the received sampled pilot signal $p(nT_r)$ sampled with receive clock $CLK_r$ will include phase offset τ as follows:

p(nT_r)=cos(2πf_p(nT_r+τ))

Conventional phase detection circuitry can readily determine a constant phase shift term φ, where φ=2πf_pτ.

In the embodiment of the invention illustrated in FIG. 4, phase and frequency offset detection function 43 receives frequency domain pilot signal P from FFT function 36, and analyzes the coefficients of the series of samples of pilot signal P (which is substantially at pilot frequency $f_p$) to detect phase offset τ and frequency offset Δ. As described above, phase and frequency offset detection function 43 can readily determine, from the values of P for the received samples, a constant phase shift φ from a comparison of the real and imaginary components of P over a series of samples. Because constant phase shift term $\phi = 2\pi f_p \tau$, phase and frequency offset detection function 43 readily derives phase offset value τ, and communicates this value to phase rotator function 40, as shown in FIG. 4.

According to the preferred embodiment of the invention, phase rotator function 40 is a digital filter operation, performable by DSP 32 according to conventional techniques, which inserts a phase shift into the frequency domain signal R'(m). As noted above, signal R'(m) includes a phase offset term $\exp(j2\pi f_m \tau)$. Accordingly, phase rotator function 40 modifies signal R'(m) by the phase shift $\exp(-j2\pi f_m \tau)$, thus removing the phase error due to phase offset τ. The output of phase rotator function 40 is thus frequency domain signal F'(m), which is a frequency domain representation of the transmitted signal F(k) but including error due to frequency offset Δ. Signal F'(m) is then received by finite impulse response (FIR) filter function 42 which, according to this embodiment of the invention, compensates for this phase error.

The theory of operation of FIR filter function 42 will now be described. In this regard, one may consider signal F'(m) as follows:

$$F'(m) = \sum_{n=0}^{N-1} \sum_{k=0}^{N-1} F(k) \cdot \exp(j2\pi f_k n T_r) \cdot \exp(-j2\pi f_m n T_r)$$

or, expressed using the difference in bin frequencies of $(f_k - f_m)$:

$$F'(m) = \sum_{n=0}^{N-1} F(k) \sum_{k=0}^{N-1} \exp(j2\pi n T_r (f_k - f_m))$$

It has been found, in connection with the present invention, that this expression for F'(m) may be approximated as:

$$F'(m) = \exp\left(j\pi m \frac{\Delta}{T_t}\right) \cdot \left[F(m) + \sum_{l=-m; l\neq 0}^{N-m-1} F(m+l) \cdot \frac{m+l}{l} \cdot \frac{\Delta}{T_t} \exp\left(\frac{-j\pi l}{N}\right)\right]$$

This expression effectively considers the received signal with frequency offset error F'(m) as the sum of the spectrum F(m) at its true bin (1=0) plus contributions (i.e., F(m+1), for 1≠0) from other bins in the spectrum. In the DMT case, these otehr bins correspond to other tones, or sub-channels.

Of course, this expression for the received spectrum F'(m) is not directly applicable to the compensation of frequency offset, as it is expressed in terms of the unknown (to receive circuitry 30) transmitted spectrum F(m). According to the preferred embodiment of the invention, however, the ratio of phase offset Δ to transmit period $T_t$ is generally very small, given that the frequency disparity is contemplated to be generally less than 100 ppm (in which case the ratio $^\Delta/_{T_t} < 10^{-4}$). Further, because the maximum tone index m is 256 in present-day ADSL DMT communication, the contribution of other bins is at most on the order of 2% of the sum. This reasonable approximation permits the above expression for F'(m) to be modified, and solved for the transmitted signal F(m), by substituting the received signal spectrum F' for the transmitted (unknown) signal, and considering this relationship as:

$$F(m) = \exp\left(-j\pi m \frac{\Delta}{T_t}\right) \cdot \left[F'(m) - \sum_{l=-m; l\neq 0}^{N-m-1} F'(m+l) \cdot \frac{m+l}{l} \cdot \frac{\Delta}{T_t} \exp\left(\frac{-j\pi l}{N}\right)\right]$$

This expression has an approximation error that is proportional to $[^\Delta/_{T_t}]^2$. Iterative evaluatiion of the above expresssion for F(m) can reduce this approximation error still further.

According to the preferred embodiment of the invention, the above approximatin expression for F(m) is implemented in FIR filter function 42, using an estimate for the frequency offset Δ produced by phase and frequency offset detection circuit 43. This expression is clearly an FIR filter, as it depends only upon inputs from the current output of FFT function 36, as processed by FEQ 38 and phase rotator function 40, and not upon previous outputs.

In operation, phase and frequency offset detection function 43 analyzes a sequence of frames to derive an estimate of frequency offset Δ, considering that non-zero frequency offset adds to the overall phase error over successive cycles. The rate at which the phase error increases over several frams will thus provide an estimate of frequency offset value Δ. As noted above, phase and frequency offset detection function 43 determines a phase offset value τ in a given frame. For purposes of determining frequency offset, phase and frequency offset detection function 43 estimates τ from the pilot tone in two frames (frames i and j, frame j being later in time than frame i) to derive the frequency offset Δ according to:

$$\tau_j = \tau_i + (j-i) \cdot N \cdot \Delta$$

As before, N is the number of samples per frame. Accordingly, phase and frequency offset detection function 43 estimates τ at two different frames, and these estimates (together with the number of elapsed frames and the number of samples per frame), derives an estimate of frequency offset Δ. Phase and frequency offset detection function 43 forwards this estimate of frequency offset Δ to FIR filter function 44, for use in derivation of the appropriate filter operation.

FIR filter function 42 thus provides a realization of the following operation upon F'(m) from the output of phase rotator function 40:

$$F(m) = \exp\left(-j\pi m \frac{\Delta}{T_t}\right) \cdot \left[F'(m) - \sum_{l=-m; l\neq 0}^{N-m-1} F'(m+l) \cdot \frac{m+l}{l} \cdot \frac{\Delta}{T_t} \exp\left(\frac{-j\pi l}{N}\right)\right]$$

where frequency offset Δ is that estimated by phase and frequency offset detection function 43. It is contemplated that those of ordinary skill in the art will be readily able to realize this filter function in present-day circuitry such as DSPs, given the above description of the filter operation. More specifically, DSP 32 will be readily able to derive transmit period $T_t$ from receive period $T_r$ and the estimate of frequency offset Δ. Because all terms in this estimate of signal F(m) are thus known by receive circuitry 30, the application of FIR filter function 42 is relatively straightforward. As indicated above, the output of FIR filter function 42 thus corresponds to transmitted signal F(m), and is presented as a series of frequency-domain coefficients. Proper sequencing and decoding of these coefficients will thus provide host computer R with the communicated data.

According to this preferred embodiment of the invention, therefore, several important advantages in the receipt of encoded and modulated transmissions are obtained. Firstly, the overall cost of the receive circuitry constructed according to the present invention is contemplated to be significantly less than according to conventional design, since the expensive functions of voltage controlled crystal oscillators, phase-locked loop circuitry, and the like are avoided. Instead, the present invention permits the use of a relatively inexpensive free run oscillator, upon which a numerically controller oscillator is based. To the extent that error due to frequency offset and phase offset is present in the receive circuitry according to the present invention, such error is readily corrected in downstream, post-sampling and post-demodulating, frequency domain processing, such processing being well within the capability of modern DSP devices. The present invention thus permits the receive circuitry in modem communications to readily receive and decode information communicated in densely packed sub-channels, while maintaining orthogonality among sub-channels.

It is contemplated that certain modifications may be readily made to the preferred embodiments of the present invention described above. For example, it is contemplated that the processing described hereinabove may be skipped or omitted for sub-channels or sub-carriers that have a signal-to-noise ratio is below a certain threshold level, in which case problems other than frequency and phase offset will dominate the transmission. It is contemplated that the determination of whether to perform the offset compensation process described above may be made in a real-time manner, during receipt and processing of the signals.

As discussed above relative to the Background of the Invention, Asynchronous Digital Subscriber Line (ADSL) modem communications are generally configured so that one of the communicating modems (generally, the central office modem or some other modem upstream from the client) generates and uses a master clock. According to conventional ADSL protocol, client-side modems nad other recipients of ADSL traffic from the central office modem are required to recover the master clock signal from the communicated data stream, and to use this recovered clock both in its sampling and demodulating of the received downstream data stream, and also in its transmission lf upstream, or reverse link, data to the central office modem. The client modem is required to communicate this reverse link data stram in a jitter-free manner, relative to the master clock signal. However, no pilot signal is generated by the client side modem in ADSL communications, as the central office modem will not respond to such a signal (instead using its master clock for sampling and demodulation). According to a second preferred embodiment of the invention, a modem is provided that utilizes a numerically controlled oscillator for receipt of communications in combination with post-processing of the demodulated signal to correct for phase and frequency offset, as described above relative to FIG. 4, and that also includes funtionality for properly processing upstream communications so as to be jitter-free relative to the master clock signal generated by the central office modem.

Figure 6:
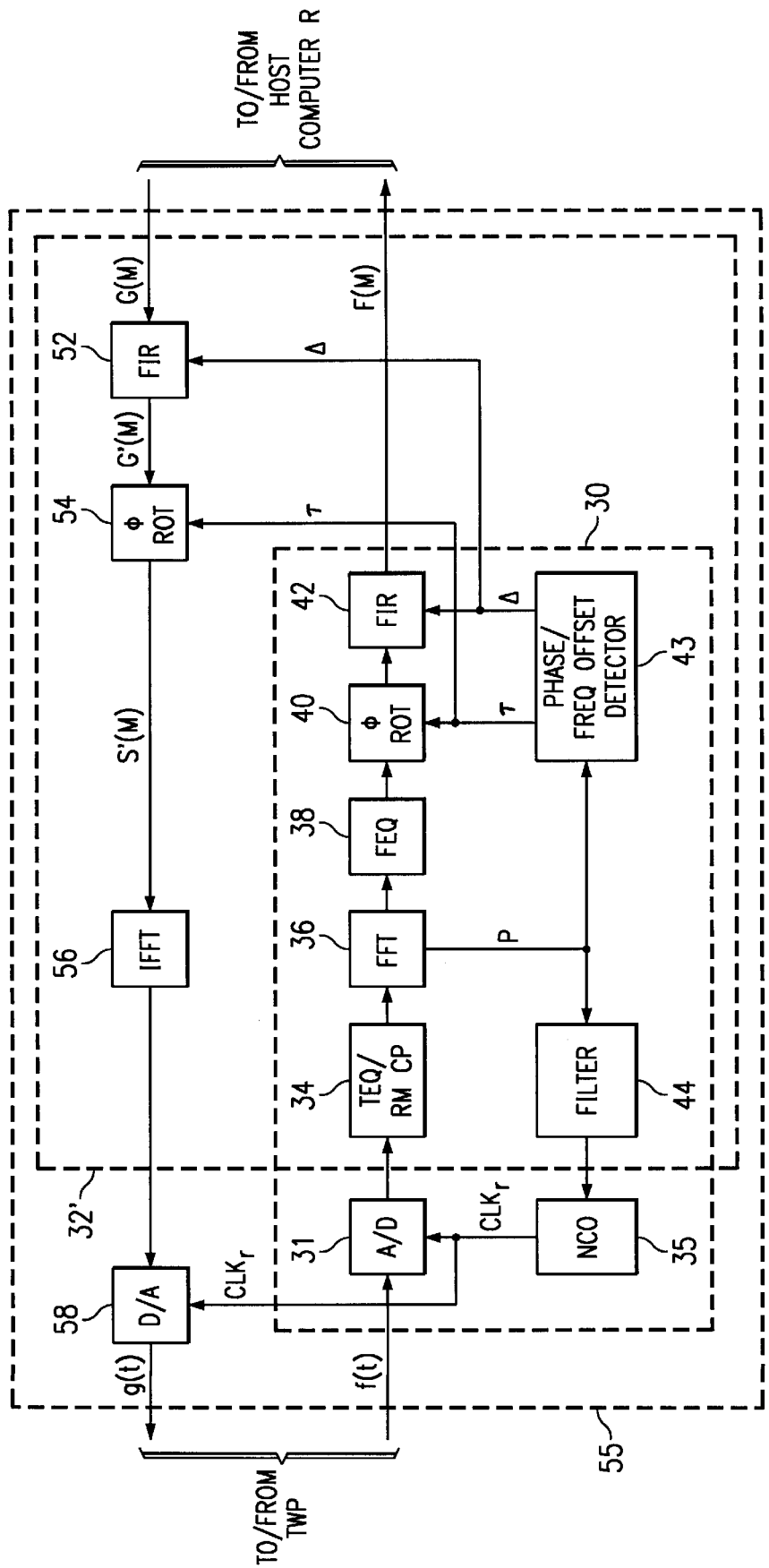
FIG. 6 is an electrical diagram, in block form, of a modem constructed according to a second preferred embodiment of the present invention.

Referring now to FIG. 6, the construction and operation of modem 55 according to this second preferred embodiment of the invention will now be described. Modem 55 is an example of a client modem in an ADSL communications requirement such as shown in FIG. 3, and as such receives a time-domain signal f(t) over twisted pair facility TWP that includes a pilot signal, as described above. This pilot signal corresponds to a master clock signal generated by the modem transmitting signal f(t); the transmitting modem is, in this ADSL environment, generally located at the central office.

Modem 55 includes receive circuitry 30 as described above relative to FIG. 4, which processes signal f(t) into a corresponding digital signal F(m) that is communicated to host computer R in the system. In summary, receive circuitry 30 samples and demodulates (i.e., transforms into the frequency domian by way of FFT function 36) input signal f(t), under the sunchronous control of receive clock $CLK_r$ generated by numerically controlled oscillator 35. Additional functions, such as time domain equalization and cyclic pulse removal function 34, are applied to the sampled signal prior to FFT function 36. Because of the phase and frequency offset between receive clock $CLK_r$ and the master clock with which signal f(t) is modulated and transmitted, receive circuitry 30 applies phase offset and frequency offset corrections after demodulation, by way of phase rotator function 40 and FIR filter function 42, as described above, through the operation of phase and frequency offset detection function 43. Digital signal F(m) is then forwarded from modem 55 to host computer R, as described above.

Also as described above, modem 55 is preferably realized by way of digital signal processor (DSP) 32', such as a DSP of the TMS320C6x class available from Texas Instruments Incorporated. Time domain equalization and cyclic pulse removal function 34, FTT function 36, FEQ function 38, phase rotator function 40, FIR filter function 42, phase and frequency offset detection function 43, and pilot signal filter function 44, are all realized by DSP 32' in this preferred embodiment of the invention, by way of executable program instructions.

Modem 55 also has a transmit side, for generating "upstream" signals to the central office by way of twisted pair facility TWP. According to ADSL standards, this upstream, or "reverse link" signal g(t) generated by modem 55 does not include a pilot signal, as did the downstream signal f(t). The absence (or, more specifically, lack of requirement) of the pilot signal is because the central office modems in ADSL communications generate and use a master clock signal in their operation, used both in its transmission and also its receipt. In addition, many types of clock recovery techniques are used in client ADSL modems, which would cause various types of pilot signals to be generated. Accordingly, the ADSL standards require that the client side modems, such as modem 55, recover the master clock signal from the received data stream, and use this recovered clock to generated a jitter-free reverse link bitstream, thus ensuring that the upstream transmission is received by the central office modem in a synchronized manner relative to the master clock signal.

According to the second preferred embodiment of the present invention, the clock circuitry includes numerically controlled oscillator 35, which is based upon a free run oscillator; alternatively, as discussed above, a non-tuned free run oscillator may be utilized for sampling and other synchronous control of modem 55 in a non-tuned arrangement, in which the sample reference point is advanced or retarded according to the relationship between the free run frequency and the transmit, or master clock, frequency. Modem 55 utilized this receive clock $CLK_r$ also to control the transmission of the reverse link signal. Accordingly, phase offset and frequency offset will be present between the local receive clock $CLK_r$ generated, in this example, by numerically controlled oscillator 35, and the master clock with which signal f(t) is transmitted and according to which the central office modem is expecting the reverse link bitstream.

According to this second embodiment of the present invention, modem 55 applies a pre-emphasis filter to the digital signal to be transmitted, prior to its modulation, sampling, and transmission, so that the phase and frequency offset arising from the clock offset will not distort the signal, but will instead place it into a form that is consistent with the master clock of the central office modem.

According to this second preferred embodiment of the invention, modem 55 includes a transmit side that includes finite impulse response (FIR) filter function 52, phase rotator function 54, and inverse Fast Fourier Transform (IFFT) function 56. In this example, each of these functions are digital functions, and as such are preferably realized by code executed by DSP 32', as shown in FIG. 6.

FIR filter function 52 receives digital signal G(m), directly or indirectly, from host computer R. FIR filter funcion 52 is a digital filter that applies a pre-emphasis correction to signal G(m), based upon the estimate of frequency offset between the master clock of central office modem 100 and receive clock $CLK_r$, as described above. This frequency offset estimate $\Delta$ is communicated to FIR filter function 52 by phase and frequency offset detection function 43, described hereinabove.

The FIR filter applied by function 52 to signal G(m) is based upon the same theory of operation as the post-demodulation correction described above relative to FIG. 3. As discussed above relative to the receipt of signal f(t), the received signal with frequency (but not phase) offset F'(m) may be expressed, in terms of the true transmitted spectrum F(m), as follows:

$$F'(m) = \exp\left(j\pi m \frac{\Delta}{T_t}\right) \cdot \left[F(m) + \sum_{l=-m; l \neq 0}^{N-m-1} F(m+l) \cdot \frac{m+l}{l} \cdot \frac{\Delta}{T_t} \exp\left(\frac{-j\pi l}{N}\right)\right]$$

In the transmit side, therefore, FIR filter function 52 produces a pre-emphasized signal G'(m) that includes a compensation for the frequency offset effects that will occur during modulation and sampling, based upon the estimated frequency offset $\Delta$ and the known incoming signal G(m):

$$G'(m) = \exp\left(j\pi m \frac{\Delta}{T_t}\right) \cdot \left[G(m) + \sum_{l=-m; l \neq 0}^{N-m-1} G(m+l) \cdot \frac{m+l}{l} \cdot \frac{\Delta}{T_t} \exp\left(\frac{-j\pi l}{N}\right)\right]$$

As before, the transmit period $T_t$ of central office modem 100 is known by modem 50, and can be readily inserted into FIR filter function 52.

One should note, however, that the value of m will generally be different for the upstream transmission of signals from remote modem 50 to central office modem 100, due to the asynchronous nature of ADSL communication. For example, the upstream value of m will generally be 32, for the case where the downstream value of m is 256. As such, the effect of frequency offset on upstream communications will generally be an order of magnitude less than the effect on downstream communications. As such, it is contemplated that FIR filter function 52 will be readily able to pre-emphasize signal G(m) to compensate for such effects.

Signal G'(m) is then applied to phase rotator function 54 which applies a phase shift in an amount corresponding to the estimate of phase offset $\tau$ generated by phase and frequency offset detection function 43. The phase shift inserted by phase rotator funtion 45 will be of an amount to compensate for the expected phase shift due the phase error between receive signal $CLK_r$ and the master clock. Accordingly, the phase shift inserted by phase rotator funtion 54 will be the same as that inserted by phase rotator function 40 described above, namely the phase shift $\exp(-j2\pi f_m \tau)$; this phase shift will be inserted bin-by-bin into signal G'(m), producing shifted output S'(m). The subsequent phase error of $\exp(-j2\pi f_m \tau)$, due to phase offset $\tau$, is thus pre-compensated by phase rotator function.

The output of phase rotator function 40 is thus frequency domain signal S'(m), which is a frequency domain representation of the input signal G(m) but including pre-compensation for error caused both by frequency offset $\Delta$ and phase offset $\tau$. Signal S'(m) is applied to inverse Fast Fourier Transform (IFFT) function 56, which generates a series of samples corresponding to a sampled time-domain representation of the signal S'(m). This sampled time-domain signal is applied to digital-to-analog converter (D/A) 58, which generates analog transmission signal g(t), modulatled to the appropriate frequency based upon receive clock $CLK_r$. As noted above, of course, the transmitted signal g(t) is pre-emphasized to compensate for phase and frequency offset of clock $CLK_r$ relative to the frequency of the master clock, for example as generated by master clock 102 in central office modem 100 as shown in FIG. 3.

According to the preferred embodiment of the invention, therefore, important benefits and advantages are obtained in the construction and operation of modems, particularly client-side modems in high-speed communication environments such as ADSL and the like. As noted above, the present invention provides the ability of such modems to utilize low-cost and low-complexity local clock circuitry, such as numerically controlled oscillators based upon free run oscillators, while still ensuring accuracy in retrieval of the communications by way of post-demodulation processin to correct errors due to phase and frequency offset of the transmit and receive clocks. Orthogonality among sub-channels is therefore maintained, reducing interchannel interference. Additionally, as noted above according to the second preferred embodiment of the invention, pre-emphasis of the reverse link signal may also be applied, prior to modulation, so that the time-domain signal will be accurate, as received at a central office modem operating according to a master clock.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. Receive circuitry for a telecommunications modem, comprising:

an input, for receiving a received signal, wherein the received signal includes a pilot signal corresponding to a clock signal used in generation of the received signal;

clock circuitry, for generating a receive clock, and comprising a free run oscillator;

analog-to-digital converter circuitry coupled to the input, for sampling the received signal responsive to the receive clock;

a demodulation function, coupled to an output of the analog-to-digital converter circuitry, for producing a frequency domain signal corresponding to the received signal;

a phase rotation function, for applying a phase shift to the frequency domain signal corresponding to an estimated phase offset between the receive clock and the pilot signal; and a digital filter functiion, for applying a correction to the frequency domain signal corresponding to an estimated frequency offset between the receive clock and the pilot signal.

2. The circuitry of claim 1, wherein the demodulation function comprises:
a Fast Fourier Transform function, for transforming the sampled received signal into a frequency domain signal; and
a frequency domain equalization function, for processing the frequency domain signal to compensate for channel effects.

3. The circuitry of claim 2, further comprising a digital signal processor integrated circuit;
wherein the demodulation function, phase rotation function, and digital filter function, are implemented by the digital signal processor integrated circuit.

4. The circuitry of claim 1, wherein the clock circuitry further comprises:
a frequency divider, for dividing a clock output of the free run oscillator by a slected integer to generate the receive clock; and
an integer selector, having an input coupled to the demodulation function to receive a signal corresponding to the pilot signal, and having an output coupled to the frequency divider to select the selected integer responsive to the frequency of the pilot signal.

5. The circuitry of claim 1, further comprising:
a phase and frequency offset detector function, for estimating the estimated phase offset and estimated frequency offset between the receive clock and the pilot signal.

6. A modem, for interfacing communications between an external network and a host system, comprising:
clock circuitry, for generating a modem clock, and comprising a free run oscillator;
a receive side, comprising:
an input, for receiving a received signal from the external network, wherein the received signal includes a pilot signal corresponding to a clock signal used in generation of the received signal;
analog-to-digital converter circuitry coupled to the input, for sampling the received signal responsive to the modem clock;
a demodulation function, coupled to an output of the analog-to-digital converter circuitry, for producing a frequency domain signal corresponding to the received signal;
a phase rotation function, for applying a phase shift to the frequency domain signal corresponding to an estimated phase offset between the modem clock and the pilot signal; and
a digital filter function, for applying a correction to the frequency domain signal corresponding to an estimated frequency offset between the modem clock and the pilot signal; and
transmit circuitry, coupled between the host system and the external network, for receiving a digital signal from the host system and for transmitting a corresponding analog signal to the external network.

7. The modem of claim 6, wherein the demodulation function comprises:
a Fast Fourier Transform function, for transforming the sampled received signal into a frequency domain signal; and
a frequency domain equalization function, for processing the frequency domain signal to compensate for channel effects.

8. The modem of claim 7, further comprising a digital signal processor integrated circuit;
wherein the demodulation function, phase rotation function, and digital filter function, are implemented by the digital signal processor integrated function.

9. The modem of claim 6, wherein the clock circuitry further comprises:
a frequency divider, for dividing a clock output of the free run oscillator by a selected integer to generated the receive clock; and
an integer selector, having an input coupled to the demodulation function to receive a signal corresponding to the pilot signal, and having an output coupled to the frequency divider to select the selected integer responsive to the frequency of the pilot signal.

10. The modem of claim 6, further comprising:
a phase and frequency offset detector function, for estimating the estimated phase offset and estimated frequency offset between the modem clock and the pilot signal.

11. The modem of claim 10, wherein the transmit circuitry comprises:
a digital filter function for applying a pre-emphasis correction to the digital signal corresponding to the estimated frequency offset between the modem clock and the pilot signal;
a phase rotation function for applying a pre-emphasis phase shift to the digital signal corresponding to the estimated phase offset between the modem clock and the pilot signal;
an inverse Fast Fourier Transform function, for transforming the digital signal, after pre-emphasis correction by the digital filter function and phase rotation function, into a time-domain signal; and
a digital-to-analog converter, for converting the time-dominan signal from the inverse Fast Fourier Transform function into an analog signal for application to the external network.

12. The modem of claim 11, further comprising a digital signal processor integrated circuit;
wherein the demodulation function, phase rotation funtions, digital filter functions, and inverse Fast Fourier Transform funtion are implemented by the digital signal processor integrated circuit.

13. The modem of claim 11, wherein the communications over the external network are carried according to an Asynchronous Digital Subscriber Line protocol.

14. A method of operating modem circuitry to process received communications from an external network, comprising the steps of:
generating a receive clock signal based upon a free run oscillator;
sampling a received communication signal at sample times based upon the receive clock signal;
estimating a phase offset and frequency offset between the receive clock signal and a pilot signal corresponding to the received communication signal;
transforming the sampled received communication signal into a frequency domain signal, wherein the frequency domain signal corresponds to values at a plurality of frequency bins corresponding to sub-carriers of the received communication signal;
applying, to the frequency domain signal, a phase rotation correction corresponding to the estimated phase offset;
applying, to the frequency domain signal, a digital filter function corresponding to the estimated frequency offset;

after the applying steps, communicating the corrected frequency domain signal to a host system.

15. The method of claim 14, wherein teh step of generating a receive clock signal comprises:

comparing the pilot signal frequency to the recieve clock frequency;

dividing an output of the free run oscillator by an integer selected in response to the comparing step to generate the receive clock.

16. The method of claim 15, wherein the dividing step comprises:

selecting an integer divider value from the group M−1, M, M+1, in response to the comparing step;

generating a first cycle, in a frame period, of the receive clock signal to have a period divided from the period of the output of the free run oscillator by the integer value selected in the selecting step; and generating remaining cycles in the frame period of the receive clock signal to have a period corresponding to the period of the output of the free run oscillator divided by the integer M.

17. The method of claim 14, wherein the digital filter function comprises a finite impulse response digital filter.

18. The method of claim 17, wherein the transforming and applying steps are performed by executing program instructions with a digital signal processor.

19. The method of claim 14, further comprising:

receiving an upstream digital signal from a host computer;

applying, to the upstream digital signal, a pre-emphasis digital filter function corresponding to the estimated frequency offset;

applying, to the upstream digital signal, a pre-emphasis digital filter function corresponding to the estimated phase offset;

after the applying steps, transforming the upstream digital filter into an upstream frequency domain signal;

after the transforming step, converting the upstream digital frequency domain signal into an upstream analog signal; and communicating the upstream analog signal to the external network.

* * * * *